Patented Aug. 8, 1939

2,168,934

UNITED STATES PATENT OFFICE 2,168,934

FOOD PRODUCT AND METHOD OF MAKING SAME

Robert H. Haskins and Robert H. Haskins, Jr., Providence, R. I.

No Drawing. Application July 13, 1937,
Serial No. 153,366

6 Claims. (Cl. 99—136)

This invention relates to a food, and in particular to a frozen food containing milk or milk and cream, which product is frozen in a less completely frozen state than ice cream, and has for an object to provide a new and improved food product and a method for the production of such a product that it will be capable of being produced in a semi-fluid partly frozen state and stored in such condition in standard retailers' refrigerating cabinets of the type used for the storage of ice cream without becoming completely solidified the same as ice cream.

Another object of the invention is the provision of an improved food product which is capable of being initially prepared in a partly frozen state having a semi-fluid consistency and capable of being stored in such a condition at substantially the same storage temperature conditions at which ice cream is maintained in a hardened condition, and yet be removed and dispensed at will while remaining unaffected by the freezing conditions during storage.

Another object of the invention is to provide a food product which may be served at an appreciably lower temperature in a semi-fluid state and thus be more refreshing to the consumer.

With these and other objects in view, the invention consists of certain novel features of construction, as will be more fully described, and particularly pointed out in the appended claims.

Among the consuming public there is at the present time an increased demand for a semi-frozen milk food product containing a flavoring such as malted milk or a malt substance, so that it has become very desirable in the trade to provide a ready supply of such a product in the form of a previously prepared mixture which may be delivered to the retailer at regular periods in bulk as ice cream is now supplied, and thus eliminate the separate preparation of each order of such product. In the commercial merchandising of a previously prepared malted milk product of this type, it is usual for the dealer to store such a product in standard retailers' refrigerator cabinets which are commonly used for the storage of ice cream. However, it has not been possible, heretofore, to maintain a partly frozen milk product of this character in a semi-liquid or "slushy" consistency because of the fact that the temperature within such storage containers is usually well below the freezing point of such products, generally at about 16° F. at the top portion and at about 10° F. at the bottom of the cabinet, with the result that complete solidification of the malted milk food product will take place thereby rendering the latter incapable of being dispensed in the proper consistency as desired in the trade. In order to obviate this unfavorable result, and to provide a final frozen product which will not be completely hardened when held at such low temperatures, it has been discovered that this result may be accomplished if a quantity of glycerin is incorporated in the composition of such malted milk food product in accordance with the present invention. With the presence of a content of such a substance in the composition of the frozen product, the glycerin serves not only to prevent complete freezing of the mixture at the temperature at which ice cream is held, but it also causes a material lowering of the freezing point of the mixture so that the product will be rendered unaffected and not completely hardened when stored at the same temperature as that at which ice cream is commonly stored. Thus, this mixture will remain always of a semi-fluid or incompletely frozen consistency in which form it is particularly desired by the consuming public, and yet may be at a lower temperature.

As a specific example of a satisfactory composition which may be used for providing this type of product, the following ingredients in the amounts shown, and sufficient to provide a final mixture of seven quarts, may be employed: 0.50 pound of sugar; 0.75 pound of glucose (corn sugar); 4 grammes of gum tragacanth; 2 grammes of agar-agar; 20 grammes of gelatin; 10 ounces of glycerin and 12 ounces of malted milk, malt syrup or other desired flavoring. These quantities and ingredients may be varied in accordance with the normal fat and serum solids content in the milk and cream to be subsequently mixed with this mixture in order that the fat and serum solids content of the final resultant malted milk product will be provided in the desired amounts.

The above ingredients are combined and thoroughly mixed in accordance with well known mixing methods employed in the ice cream industry to form a finished uniform mixture, sufficient water being added to the mixture in order to make a batch of approximately seven pints. To the mixture, thus formed, is then added two quarts of an ice cream mix, as will be presently described, and milk and water to form a fluid mixture of about the consistency of a malted milk shake, these ingredients being mixed, whipped and frozen together in the usual manner of preparing ice cream but being less completely frozen than ice cream in order to provide a finished frozen product of a semi-liquid consistency.

The ice cream mix consists of desired dairy product sometimes containing a preparation of heavy cream, milk, condensed skim milk, gelatin and eggs homogenized at a desired pressure. Sometimes this mix may consist only of cream which is homogenized to break up the fat globules. This mixture may be purchased either sweetened or unsweetened.

The amount of glycerin which is added is found to control the freezing point of the entire mixture and to lower the same to a point where complete solidification of the frozen product is prevented while being held at the usual storage temperature of ice cream. The amount of glycerin added may be in desired quantities, but in no case should the quantity used in the mixture be in an amount such as would impart to the consumer an undesirable sensation of burning. While in the above described composition I have specified that ten ounces of glycerin is ordinarily desirable to obtain the desired lowering of the freezing point of the particular mixture, it is found that satisfactory results may be obtained in which the quantity of glycerin content is as low as seven ounces or as high as sixteen ounces, which amounts will depend of course upon the amount of fat present in the food product. Consequently, if the percentage of fat is found to be high, the freezing point will be lowered and the glycerin content to be added will be correspondingly diminished within the limits mentioned, or even lower, in order that the resultant freezing temperature will be maintained below that at which the frozen composition is to be stored. Thus, after preparing the mixture of the ingredients above mentioned with the glycerin addition and whipping it into a thorough mixture by means of an ice cream freezer, a finished food product is produced in the condition of a soft ice cream or of semi-liquid consistency, in which form such food preparation will thereafter remain at its prepared consistency when subjected to the usual low storing temperature for ice cream rather than becoming completely solidified and frozen hard as is characteristic of ice cream. It is further found that this composition remains soft and substantially unchanged from its desired semi-liquid consistency for a period of approximately forty-eight hours after which a change in the mixture occurs wherein the mass takes on a cellular structure which may be broken up in any suitable manner, as with a spoon, or other suitable implement. After this operaation, the mixture may be kept an additional twenty-four hours whereupon the cellular structure again manifests itself due to settling of the fat globules in the mixture which hold entrapped air. If more glycerin is incorporated in the composition than the amount above recited, then the tendency for forming the cellular structure, as has heretofore been mentioned, is delayed for a longer time. The addition of glycerin to the food product in the quantities above recited is found to be extremely palatable and tasty to any person consuming the frozen product, and furnishes a desirable sweetness to the product, the amount of glycerin added being varied over a liberal range without detrimentally affecting its palatability, which condition is found to result when the quantity of glycerin used is increased to come within the limits of from ten to twenty ounces.

The glucose content will lower the freezing point lower than an equal amount of sugar and yet for the same amount is not as sweet as sugar. The gum tragacanth, agar-agar and gelatin are each present in the mixture to serve as stabilizers to give body to the product since such substances readily absorb water, often in amounts up to fifty times the weight of the particular substance employed, to increase the viscosity of the mixture to a marked degree because of their high degree of hydration and ability to form a gel, besides serving to enhance the whipping ability of the mixture. These stabilizing materials also exert a decided effect to prevent syrup drainage and in addition, to impart a finer and smoother texture to the final frozen product since they cause the formation of smaller ice crystals than would ordinarily occur with free water present. The stabilizers also prevent separation of water, holding it in hydration, and the gums are added in a semi-soft condition to the mixture in satisfactory combinations as to not become distinct enough to be objectionable in taste. The malted milk is present in the capacity of a flavoring constituent and consequently there may be substituted therefor other flavoring substances such as a wheat flavor or any other flavor.

At such time, it is further desirable that there be a high overrun, during which operation air is taken into the mixture, so that the addition of gelatin is desirable in an amount sufficient to bring about the desired result. Other gums may be employed to advantage for this purpose and substituted in place of gelatin. The term "overrun" is well known to those skilled in the art, and means the increase in volume of the final resultant frozen mixture over the initial volume of the mix, hence is the amount of air content incorporated therein by the whipping operation while in the freezer, and is commonly expressed as per cent overrun.

It will, of course, be understood that any desired quantity of flavoring substance may be added to the mixture in order to provide the finished product with the proper intensity of flavoring typical of the resulting product.

Having thus described in detail the preferred embodiment of our invention and the best manner of practising our method, it is to be understood that the invention is not limited to all of the described details, but that we reserve the privilege of resorting to all the equivalent changes to which the method is susceptible, the scope of the invention being defined and limited only by the terms of the appended claims.

We claim:

1. In the process of producing a chilled milk food product in a soupy or less completely frozen state than normal ice cream, and of a semi-liquid consistency, from a mixture containing milk solids, ice cream mix and a flavoring substance, the step which consists in preventing complete freezing and stiffening of the mixture to solidification, when stored at the temperature at which ice cream is usually stored, by adding to the mixture glycerin in a sufficient amount to depress the freezing point below that at which actual stiffening of the mixture would occur if stored under freezing conditions without said glycerin content.

2. In the process of producing a chilled milk food product in a soupy or less completely frozen state than normal ice cream and of a semi-liquid consistency, from a mixture containing milk solids, sugar, eggs, ice cream mix and a flavoring substance, the step which consists in preventing complete freezing and stiffening of the mixture to solidification, when stored at the temperature at which ice cream is usually stored, by adding to the mixture glycerin in a sufficient amount to depress the freezing point below that at which actual stiffening of the mixture would occur if stored under freezing conditions without said glycerin content.

3. A chilled food product of semi-liquid consistency comprising a mixture of sugar, glucose, gum tragacanth, agar-agar, gelatin, a malt substance and glycerin, combined with milk and a sweetened ice cream mix, said glycerin being present in sufficient quantity to prevent freezing of the mixture to complete solidification when stored at the temperature at which ice cream is usually stored.

4. A chilled food product of semi-liquid consistency comprising a mixture of sugar, glucose, gum tragacanth, agar-agar, gelatin, a malt substance and glycerin, combined with milk and a sweetened ice cream mix, said glycerin being present in sufficient quantity to maintain the mixture unaffected in its consistency when stored at the temperature at which ice cream is usually stored.

5. A new food preparation compounded in substantially the following proportions: 0.50 pound of sugar, 0.75 pound of glucose; 4 grammes of gum tragacanth, 2 grammes of agar-agar, 20 grammes of gelatin, 10 ounces of glycerin, 12 ounces of malted milk, combined with milk and 2 quarts of an ice cream mix, with an addition of sufficient water to produce a resulting mixture of approximately seven quarts.

6. A new food preparation compounded in substantially the following proportions: 0.50 pound of sugar, 0.75 pound of glucose, 4 grammes of gum tragacanth, 2 grammes of agar-agar, 20 grammes of gelatin, 10 ounces of glycerin, 12 ounces of malted milk, combined with 2 quarts of an ice cream mix, with an addition of sufficient milk and water to produce a resulting mixture of approximately 7 quarts.

ROBERT H. HASKINS.
ROBERT H. HASKINS, Jr.